Figure 1:
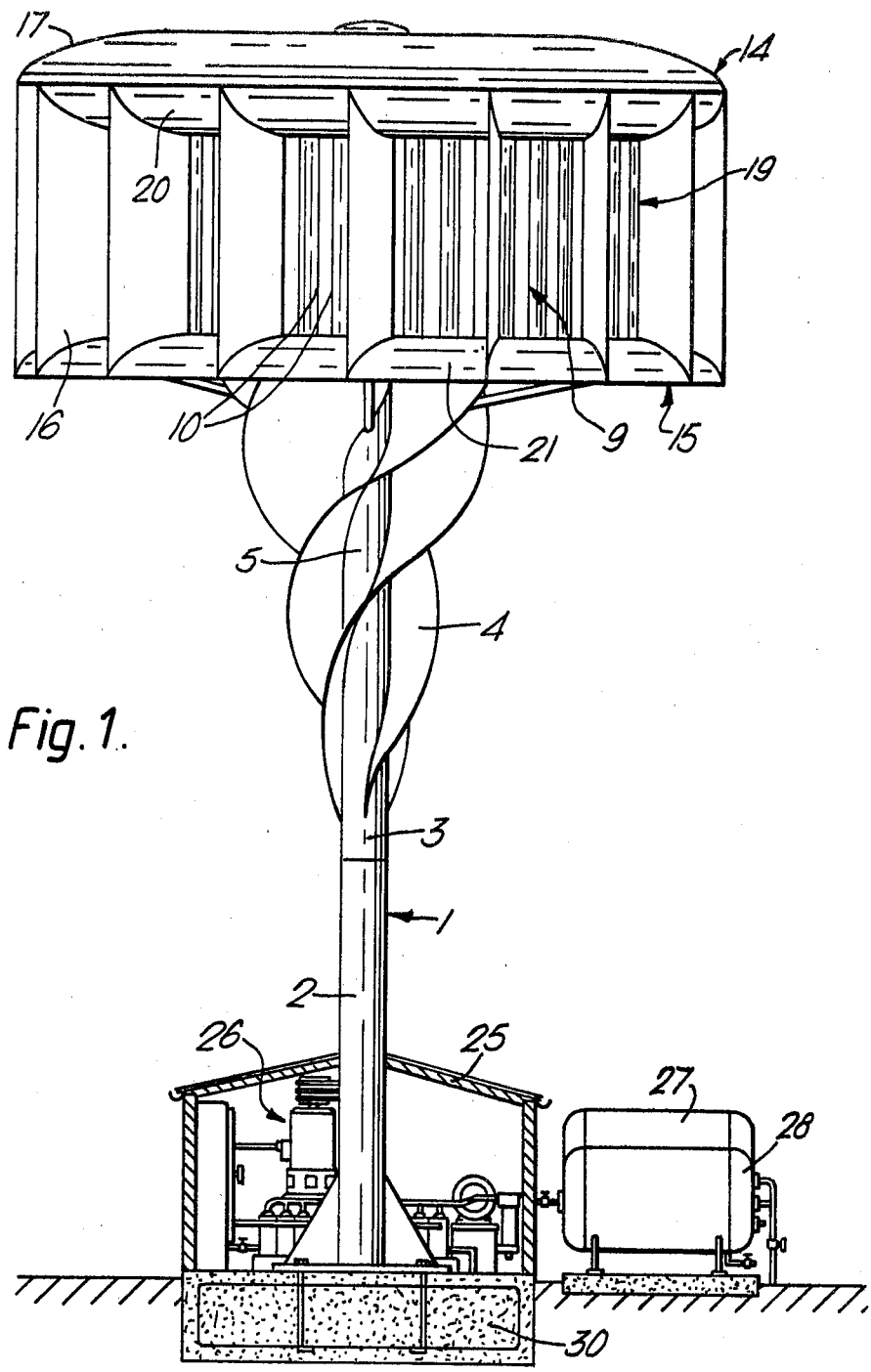

United States Patent [19]

Mewburn-Crook et al.

[11] 4,414,477
[45] Nov. 8, 1983

[54] WIND ENERGY CONVERTOR

[76] Inventors: Anthony J. S. Mewburn-Crook;
Dominic T. Mewburn-Crook, both of
16 Avenue Rd., Isleworth,
Middlesex, TW7 4JN, England

[21] Appl. No.: 357,867

[22] Filed: Mar. 15, 1982

[51] Int. Cl.³ .............................................. F03D 9/00
[52] U.S. Cl. ......................................... 290/55; 415/3;
415/DIG. 8; 416/122; 416/175
[58] Field of Search ....................................... 415/2–4;
416/120, 122, 175 A; 290/44, 55

[56] References Cited

U.S. PATENT DOCUMENTS

| | | | |
|---|---|---|---|
| 268,292 | 11/1882 | Robinson | 416/175 A |
| 918,364 | 4/1909 | Pope | 415/4 |
| 1,128,636 | 2/1915 | Terzian | 416/175 A |
| 4,031,175 | 6/1977 | Rogers | 290/55 |
| 4,184,084 | 1/1980 | Crehore | 290/55 |
| 4,224,528 | 9/1980 | Argo | 415/2 R |

Primary Examiner—J. V. Truhe
Assistant Examiner—Shelley Wade
Attorney, Agent, or Firm—Buell, Blenko, Ziesenheim & Beck

[57] ABSTRACT

Apparatus for converting the energy of the wind into mechanical energy for use in the generation of electricity comprises an upstanding column a fan which is freely rotatably mounted on the column and which comprises circumferentially spaced, radially extending blades and, supported by and freely rotatable about the axis of the column, a turbine which surrounds and is radially spaced from the column and which comprises circumferentially spaced blades extending lengthwise with respect to the column. Preferably, an annular body is supported by the column and has an upper surface of such a shape as to encourage laminar flow of the wind over its surface. Preferably, also, over an upper part of its length immediately below the fan the column has circumferentially spaced, helically extending fins 4 defining passages wind being caused to flow upwardly within the passages to form a vortex. Circumferentially spaced blades depending from the annular body define, between adjacent blades, venturi through which wind is directed on to the blades of the turbine.

18 Claims, 2 Drawing Figures

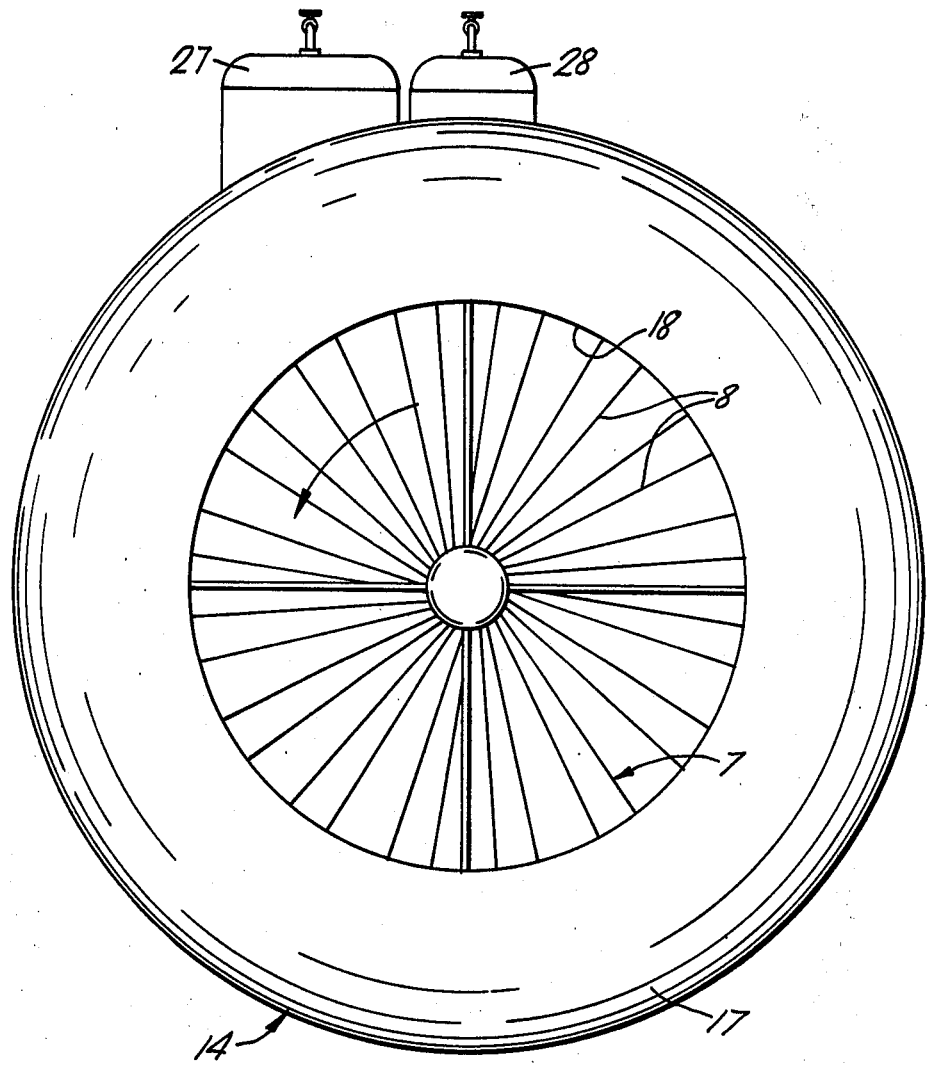

WIND ENERGY CONVERTOR

This invention relates to apparatus for converting the energy of the wind into mechanical energy for use in the generation of electricity or other source of power and, for convenience, such apparatus will hereinafter be referred to by the generic expression "wind energy convertor".

It is an object of the present invention to provide an improved wind energy convertor which will convert into mechanical energy the energy of a wind blowing in substantially any direction, which does not have to be "feathered" or otherwise adjusted in the event of winds of gale force or above, and which is so stabilised that it will continue to operate satisfactorily in winds of gale force with substantially no risk of being blown over or otherwise damaged.

According to the invention the improved wind energy convertor comprises an upstanding column; fan which is supported on the upper end of the column in such a way that the fan is freely rotatable about the axis of the column and which comprises a plurality of circumferentially spaced, radially extending blades; and, supported by, and freely rotatable about the axis of, the column, a substantially circular turbine which surrounds and is radially spaced from an uppermost part of the column and which comprises a plurality of circumferentially spaced blades extending lengthwise with respect to the column, the arrangement being such that wind blowing against the blades of the turbine will drive the turbine rotatably about the axis of the column to cause wind to be directed upwardly within the turbine to drive the fan rotatably about the axis of the column in the same rotational direction as the turbine, thereby converting the energy of the wind into rotational mechanical energy.

With a view to reducing the inherent resistance of the fan to rotation about the axis of the column and thereby increasing the velocity of wind flowing through the fan, preferably the wind energy convertor includes an annular body which is supported by the column and which is co-axial with and is positioned adjacent to the outer circumferential edge of the fan, the upper surface of the annular body being above the fan and being so shaped as to cause the velocity of wind that blows against this surface to increase as it passes over the surface, thereby creating a reduction in air pressure in the circular space bounded by the annular body. Preferably, the upper surface of the annular body is of such a shape as to encourage laminar flow of the wind over its surface. In a preferred embodiment, the angle of inclination of the upper surface to the axis of the column increases smoothly in an upward direction. The increase in velocity of wind flowing upwardly through the fan arising from the shape of the upper surface of the annular body creates a reduction in air pressure in the annular space between the column and the surrounding turbine, with the result that the inherent resistance of the turbine to rotation about the axis of the column is also reduced.

Preferably, over an upper part of its length immediately below the fan, the upstanding column has at least two circumferentially spaced, helically extending fins delining between them at least two helically extending passages, the depth of each fin, and hence the depth of each passage, increasing smoothly and the pitch of the radially outer edge of the each fin decreasing smoothly from the lower ends of the fins to the upper ends of the fins.

The circumferentially spaced, helically extending fins on the upper part of the column effectively cause wind flowing within the helically extending passages to form a vortex. Since the column will be positioned within the "eye" of the vortex, the column is, in effect, self-stabilising and is therefore able to convert into mechanical energy, the energy of winds of gale force, thereby taking advantage of the fact that the energy of the wind increases with the cube of its velocity.

Preferably, the depth of each helically extending fin increases hyperbolically. Preferably, also, the uppermost ends of the fins are so shaped, and are so positioned with respect to the radially extending blades of the fan, as to act as stator blades.

Preferably, to accelerate a larger volume of wind between the blades of the turbine and thereby increase still further the amount of wind energy available for conversion, the wind energy convertor further includes, radially outwardly of and surrounding the turbine, a plurality of circumferentially spaced blades which extend lengthwise with respect to and are supported by the column and which define, between adjacent blades, a plurality of venturi through which wind is directed on to the blades of the turbine, the surfaces of the venturi blades being so shaped as to direct the wind on to the blades of the turbine and, at the same time, to shield from the wind the on-coming blades of the turbine, thereby substantially reducing any drag on the turbine and enabling the turbine to rotate such that its peripheral velocity preferably does not exceed twice the linear velocity of the wind. Preferably, the venturi blades extend downwardly from the underside of the annular body and are secured between the annular body and a second annular body coaxial with and spaced below the first annular body. The radially outer edges of the venturi blades may extend substantially vertically but, preferably, they are inclined radially outwardly in a direction towards the upper end of the convertor.

The fan and the turbine may be independently freely rotatable about the axis of the column but, preferably, the fan and the turbine are rigidly secured together so that both will rotate at the same speed.

The upper part of the column carrying the helical fins and supporting the annular body and the venturi blades may be separately formed with respect to, and may be freely rotatable or rotatably driven about the axis of, the remainder of the column so that, for winds of very high speeds, e.g. above 100 mph, the annular body and the venturi blades can be caused to rotate in the same rotational direction about the axis of the column as that of the turbine so that, at such high wind speeds, the difference in speeds between the turbine and the venturi blades is maintained substantially constant.

The electrical generators and/or other ancillary equipment associated with the generation of electricity or other source of power are preferably located in a housing at the foot of the column, the column preferably passing centrally through the housing. If desired, the outer wall of the housing may be of approximately parabolic shape to assist in directing a vertical component of the wind upwardly of the column.

The improved wind energy convertor of the present invention ensures that both the horizontal and vertical components of the energy of the wind are converted into mechanical energy without inhibiting to any great extent the natural movement of the wind. Furthermore, the plurality of radially extending blades of the fan and the plurality of longitudinally extending blades of the turbine provide the important advantage that the improved wind energy convertor is self-starting, irrespective of the direction of the wind. Additionally, the improved wind energy convertor is pleasing to the eye and can therefore be installed in areas of natural beauty without being any more obtrusive than the conventional sail mill.

The mechanical energy obtained by conversion of the energy of the wind may be used in the generation of electricity by means of any convenient and known method or, if desired, the mechanical energy may be employed to produce power to split water (an abundant and free electrolyte) into the gases hydrogen and oxygen, which can be stored in a readily available form, the hydrogen for use as a non-polluted fuel and the oxygen as a useful or saleable commodity. Hydrogen can be used to run existing generators to produce electricity with no lead or carbon pollution from the exhaust; it can also be used to power certain forms of apparatus, e.g. cookers, boilers, furnaces and oxy-hydrogen welding apparatus; Additionally, hydrogen and oxygen can feed fuel cells which produce electricity directly without any moving parts.

Accordingly, the invention also includes, in combination, a wind energy convertor operatively coupled to apparatus for splitting water into hydrogen and oxygen, and means for storage of the oxygen and hydrogen produced.

The wind energy convertor used in this combination is preferably the improved wind energy convertor as hereinbefore described.

The invention will be further illustrated by a description, by way of example, of a preferred wind energy convertor with reference to the accompanying drawings, in which:

FIG. 1 is a side view of the wind energy convertor, shown partly in elevation and partly in section, drawn on a reduced scale, and FIG. 2 is a plan view of the wind energy convertor shown in FIG. 1.

Referring to the drawings, the preferred wind energy convertor comprises a rigid vertical column 1 which consists of a lower part 2 mounted on a foundation 30 and a separately formed upper part 3 of circular cross-section which is so mounted on the lower part that the upper part is free to rotate about the vertical axis of the column. The upper part 3 carries four helically extending fins 4, adjacent fins defining between them helically extending passages 5. The depth of each fin 4, and hence of each passage 5, increases smoothly from a minimum value at the lower end of the upper part 3 to a maximum value at its upper end; the pitch of the fins at their radially outer edges decreases smoothly in a direction towards the upper end of the column 1.

Freely rotatably mounted on, and about the vertical axis of, the upper part 3 of the column 1, is a fan 7 comprising a plurality of circumferentially spaced, radially extending blades 8. Rigidly secured to and depending downwardly from the outer circumferential edge of the fan 7 is a turbine 9 comprising a plurality of circumferentially spaced blades 10 extending lengthwise with respect to the column.

Separately formed with respect to the fan 7 and turbine 9 and surrounding the fan and turbine are two annular bodies 14 and 15 which are spaced lengthwise of and are rigidly secured to the upper part 3 of the column 1 and which are interconnected by a plurality of circumferentially spaced blades 16 lying in substantially vertical radial planes. The upper surface 17 of the annular body 14 is positioned above the fan 7 and is so shaped as to cause the velocity of wind that blows against this surface to increase as it passes over the surface, thereby creating a reduction in air pressure in the circular space 18 above the fan bounded by the annular body. The vertical blades 16 define, between adjacent blades, a plurality of venturi 19 through which wind is directed on to the blades 10 of the turbine 9. The surfaces of the venturi blades 16 are so shaped as to direct the wind on to the blades 10 of the turbine 9 and, at the same time, to shield from the wind the on-coming blades of the turbine. The undersurface 20 of the annular body 14 and the upper surface 21 of the annular body 15 are also so shaped as to assist in directing and accelerating wind through the venturi 19 on to the blades 10 of the turbine 9.

The uppermost end of the fins 4 are so shaped, and are so positioned with respect to the radially extending blades 8 of the horizontal fans 7, as to act as stator blades.

At the foot of the column 1, the lower part 2 passes centrally through a housing 25 in which are accommodated the electrical generators and other equipment, generally indicated at 26, associated with the splitting of water into the gases hydrogen and oxygen, hydrogen being stored in a tank 27 and oxygen being stored in a tank 28 so that both gases are stored, at either high or low pressure, in a readily available form.

Wind blowing against the column 1 will be directed upwardly within the helically extending passages 5 to drive the horizontal fan 7, and wind blowing against the blades 10 of the turbine 9 will drive the turbine, rotatably about the vertical axis of the column in an anti-clockwise direction. Since the velocity of wind blowing against the uppermost surface 17 of the annular body 14 is caused to increase as it passes over the surface, a reduction in air pressure is created in the circular space 18 above the fan 7 and consequently the velocity of wind flowing up the passages 5 will increase. The increase in velocity of wind flowing up the helical passages 5 creates a reduction in air pressure in the annular space between the helically extending fins 4 and the turbine 9, with the result that the inherent resistance of the turbine to rotation about the vertical axis of the column 1 is also reduced. The amount of wind energy available for conversion is further increased by the venturi 19 because wind flowing through these openings is accelerated and directed on to the blades 10 of the turbine 9, in such a way as to assist in driving the turbine in an anti-clockwise direction, the blades 16 defining the venturi being so shaped as to shield from the wind the on-coming blades 10 of the turbine, thereby substantially reducing any drag on the turbine and enabling the turbine to rotate at substantially the same linear velocity as that of the wind.

In the event that the velocity of the wind exceeds a predetermined high value, say 100 mph, the upper part 3 of the column 1, on which are carried the annular bodies 14 and 15 and the blades 16 defining the venturi 19, is also caused to rotate in an anti-clockwise direction at such a speed that the speed of the turbine 9 relative to that of upper part 3 is substantially constant.

As illustrated diagrammatically in FIG. 1, the mechanical energy of the wind energy convertor can be used to power conventional equipment 26 for splitting water into the gases hydrogen and oxygen, the hydrogen and oxygen, respectively, being stored in tanks 27 and 28, thereby providing a source of power in a readily available form at any time, irrespective of the strength of the wind. Alternatively, the mechanical energy provided by the wind energy connector can be used in the generation of electricity.

What we claim as our invention is:

1. A wind energy convertor comprising an upstanding column; a fan which is supported on the upper end of the column in such a way that the fan is freely rotatable about the axis of the column and which comprises a plurality of circumferentially spaced radially extending blades; and, supported by, and freely rotatable about the axis of, the column, a substantially circular turbine which surrounds and is radially spaced from an uppermost part of the column and which comprises a plurality of circumferentially spaced blades extending lengthwise with respect to the column, the arrangement being such that wind blowing against the blades of the turbine will drive the turbine rotatably about the axis of the column to cause wind to be directed upwardly within the turbine to drive the fan rotatably about the axis of the column in the same rotational direction as the turbine, thereby converting the energy of the wind into rotational mechanical energy.

2. A wind energy convertor comprising an upstanding column; a fan which is supported on the upper end of the column in such a way that the fan is freely rotatable about the axis of the column and which comprises a plurality of circumferentially spaced radially extending blades; a substantially circular turbine which is supported by, and is freely rotatable about the axis of, the column, which surrounds and is radially spaced from an uppermost part of the column and which comprises a plurality of circumferentially spaced blades extending lengthwise with respect to the column; and an annular body which is supported by the column and is coaxial with and is positioned adjacent to the outer circumferential edge of the fan, and which has an upper surface positioned above the fan and so shaped as to cause the velocity of wind that blows against the surface to increase as it passes over the surface and so create a reduction in air pressure in the circular space bounded by the annular body, the arrangement being such that wind blowing against the blades of the turbine will drive the turbine rotatably about the axis of the column to cause wind to be directed upwardly within the turbine to drive the fan rotatably about the axis of the column in the same rotational direction as the turbine and that the velocity of wind flowing upwardly through the fan as a result of the reduction in air pressure in the circular space bonded by the annular body is increased, thereby converting the energy of the wind into rotational mechanical energy.

3. A wind energy convertor as claimed in claim 2, wherein the upper surface of the annular body is of such a shape as to encourage laminar flow of the wind over its surface.

4. A wind energy convertor as claimed in claim 3, wherein the angle of inclination of the upper surface of the annular body to the axis of the column increases smoothly in an upward direction.

5. A wind energy convertor comprising an upstanding column; a fan which is supported on the upper end of the column in such a way that the fan is freely rotatable about the axis of the column and which comprises a plurality of circumferentially spaced radially extending blades; a substantially circular turbine which is supported by, and is freely rotatable about the axis of, the column, which surrounds and is radially spaced from an uppermost part of the column and which comprises a plurality of circumferentially spaced blades extending lengthwise with respect to the column; and, over an upper part of the length of the upstanding column immediately below the fan, at least two circumferentially spaced, helically extending fins defining between them at least two helically extending passages, the depth of each fin, and hence of each passage, increasing smoothly and the pitch of the radially outer edge of each fin decreasing smoothly from the lower ends of the fins to the upper ends of the fins, the arrangement being such that wind blowing against the blades of the turbine will drive the turbine rotatably about the axis of the column to cause wind to be directed upwardly within the turbine and along the helically extending passages to drive the fan rotatably about the axis of the column in the same rotational direction as the turbine, thereby converting the energy of the wind into rotational mechanical energy.

6. A wind energy convertor as claimed in claim 5, wherein an annular body is supported by the column and is coaxial with and is positioned adjacent to the outer circumferential edge of the fan, the upper surface of the annular body being above the fan and being so shaped as to cause the velocity of wind that blows against the surface to increase as it passes over the surface, thereby creating a reduction in air pressure in the circular space bounded by the annular body and so effecting an increase in velocity of wind flowing upwardly through the fan.

7. A wind energy convertor as claimed in claim 5 or 6, wherein the depth of each helically extending fin increases hyperbolically.

8. A wind energy convertor as claimed in claim 5 or 6, wherein the uppermost ends of the fins are so shaped, and are so positioned with respect to the radially extending blades of the fan, as to act as stator blades.

9. A wind energy convertor comprising an upstanding column; a fan which is supported on the upper end of the column in such a way that the fan is freely rotatable about the axis of the column and which comprises a plurality of circumferentially spaced radially extending blades; a substantially circular turbine which is supported by, and is freely rotatable about the axis of, the column, which surrounds and is radially spaced from an uppermost part of the column and which comprises a plurality of circumferentially spaced blades extending lengthwise with respect to the column; and a plurality of circumferentially spaced blades which surround and are positioned radially outwardly of the turbine and which extend lengthwise with respect to and are supported by the column and define, between adjacent blades, a plurality of venturi through which wind is directed on to the blades of the turbine, the arrangement being such that wind blowing against the blades of the turbine will drive the turbine rotatably about the axis of the column to cause wind to be directed upwardly within the turbine to drive the fan rotatably about the axis of the column in the same rotational direction as the turbine, thereby converting the energy of the wind into rotational mechanical energy, and the surfaces of the venturi blades being so shaped as to direct the wind on to the blades of the turbine and, at the same time, to shield from the wind the on-coming blades of the turbine.

10. A wind energy convertor as claimed in claim 9, wherein the venturi blades extend downwardly from the underside of the annular body and are secured between the annular body and a second annular body coaxial with and spaced below the first annular body.

11. A wind energy convertor as claimed in claim 10, wherein the undersurface of the first annular body and the upper surface of the second annular body are so shaped as to assist in directing and accelerating wind through the venturi on to the blades of the turbine.

12. A wind energy convertor as claimed in any one of claims 9 to 11, wherein the radially outer edges of the venturi blades are inclined radially outwardly in a direction towards the upper end of the convertor.

13. A wind energy convertor as claimed in any one of claims 2, 5 and 6 wherein a plurality of circumferentially spaced blades surround and are positioned radially outwardly of the turbine, which blades extend lengthwise with respect to and are supported by the column and define, between adjacent blades, a plurality of venturi through which wind is directed on to the blades of the turbine, the surfaces of the venturi blades being so shaped as to direct the wind on to the blades of the turbine and, at the same time, to shield from the wind the on-coming blades of the turbine.

14. A wind energy convertor as claimed in any one of claims 1, 2, 5 and 9, wherein the fan and the turbine are rigidly secured together so that both will rotate at the same speed.

15. A wind energy convertor as claimed in any one of claims 1, 2, 5 and 9, wherein the upper part of the column is separately formed with respect to, and is freely rotatable or rotatably driven about the axis of, the remainder of the column.

16. A wind energy convertor as claimed in claim 1, wherein a housing is positioned at the foot of the column and ancillary equipment associated with the generation of electricity is located in the housing.

17. A wind energy convertor as claimed in claim 16, wherein the outer wall of the housing is of approximately parabolic shape to assist in directing a vertical component of the wind upwardly of the column.

18. In combination, a wind energy convertor as claimed in any one of claims 1, 2, 5 and 9, operatively coupled to apparatus for splitting water into hydrogen and oxygen, and means for storage of the oxygen and hydrogen produced.

* * * * *